(12) United States Patent
Snyder

(10) Patent No.: US 11,968,986 B2
(45) Date of Patent: Apr. 30, 2024

(54) ELECTRIC GAFF HOOK SYSTEM

(71) Applicant: Elizabeth Snyder, Apopka, FL (US)

(72) Inventor: Elizabeth Snyder, Apopka, FL (US)

( * ) Notice: Subject to any disclaimer, the term of this patent is extended or adjusted under 35 U.S.C. 154(b) by 0 days.

(21) Appl. No.: 18/215,537

(22) Filed: Jun. 28, 2023

(65) Prior Publication Data

US 2024/0016165 A1    Jan. 18, 2024

Related U.S. Application Data

(60) Provisional application No. 63/389,645, filed on Jul. 15, 2022.

(51) Int. Cl.
| | |
|---|---|
| *A22B 3/00* | (2006.01) |
| *A22B 3/06* | (2006.01) |
| *A22B 3/08* | (2006.01) |
| *A22B 3/10* | (2006.01) |

(52) U.S. Cl.
CPC ............... *A22B 3/06* (2013.01); *A22B 3/083* (2013.01); *A22B 3/10* (2013.01)

(58) Field of Classification Search
CPC ............. A22B 3/06; A22B 3/083; A22B 3/10

USPC ........................................................ 452/57
See application file for complete search history.

(56) References Cited

U.S. PATENT DOCUMENTS

| | | | | |
|---|---|---|---|---|
| 5,732,501 A | * | 3/1998 | Ausburn | A01K 97/14 43/17.1 |
| 7,174,668 B2 | * | 2/2007 | Locklear | A01K 79/02 231/7 |

* cited by examiner

*Primary Examiner* — Richard T Price, Jr.
(74) *Attorney, Agent, or Firm* — Jason T. Daniel, Esq.; Daniel Law Offices, P.A.

(57) ABSTRACT

An electric gaff hook device includes an elongated pole having at least one hook that is positioned along the distal end. Each of the hooks including a curved shape, a sharpened tip, and a plurality of electrodes. A controller, user interface, power source and power output unit are provided along the pole. The power output unit receives power from the power source and sends amplified power to the plurality of electrodes based on a command from the user interface. The power discharged by the electrodes functions to stun and immobilize a fish for between about 1 and 3 minutes. A spike is provided along the distal end of the pole and includes a plurality of apertures forming a channel for receiving an elongated wire to euthanize and perform ike jime on the stunned fish.

9 Claims, 3 Drawing Sheets

ELECTRIC GAFF HOOK SYSTEM

CROSS-REFERENCE TO RELATED APPLICATIONS

This application claims the benefit of U.S. Application Ser. No. 63/389,645 filed on Jul. 15, 2022, the contents of which are incorporated herein by reference.

TECHNICAL FIELD

The following disclosure contemplates various embodiments of a gaff hook that is capable of imparting an electrical shock onto a fish from a plurality of terminals.

BACKGROUND

The statements in this section merely provide background information related to the present disclosure and may not constitute prior art.

When fishing from a boat in an offshore environment, it is common to utilize a gaff hook to lift a fish that has been caught using a rod and reel from the water onto a boat. During this process, it is not uncommon for the captured fish to thrash violently upon being hauled onto the deck. Although this is fine for smaller fish, the thrashing motion of large fish such as tuna, halibut or Mahi, for example, has been known to cause serious injury to fisherman and deckhands on the boat.

In either instance, once the fish is onboard, the fisherman typically utilizes a small bat or other implement to strike the head of the fish so it does not suffer from asphyxiation. Unfortunately, due to the thrashing of the fish, it often takes several attempts to accurately strike the fish and several more strikes to actually dispatch the fish. This process is messy, labor intensive and can take a fair amount of time based on the actions of the fish and the skill of the fisherman.

Accordingly, it would be beneficial to provide an electric gaff hook device that can aid a fisherman in placing the fish onto a boat while eliminating the drawbacks and dangers noted above.

SUMMARY OF THE INVENTION

The present invention is directed to an electric gaff hook device. One embodiment of the present invention can include an elongated pole having at least one hook that is positioned along the second end of the pole. Each of the hooks includes a curved shape, a sharpened tip, and a plurality of electrodes. The device can include an electronic suite having a controller, a user interface, a power source, and a power output unit.

The power source can include a plurality of batteries that provide power to the device components. The power output unit can amplify and send power to the plurality of electrodes based on a command from the user interface. The power output can be calculated to stun and immobilize a fish for between about 1 and 3 minutes, to allow a user time to haul the fish onto a boat.

In one embodiment, an elongated spike can be provided along the second end of the pole. The spike can include a plurality of apertures which form a channel for receiving an elongated wire. The spike can be used to euthanize a fish, and the wire can be inserted along the spinal column of the fish to prevent continued movement of the fish's muscles to preserve the flavor of the fish meat in accordance with the traditional practice of ike jime.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably positioned," and derivatives thereof shall be used to describe a situation wherein two or more objects are joined together in a non-permanent manner so as to allow the same objects to be repeatedly joined and separated.

Figure 1:
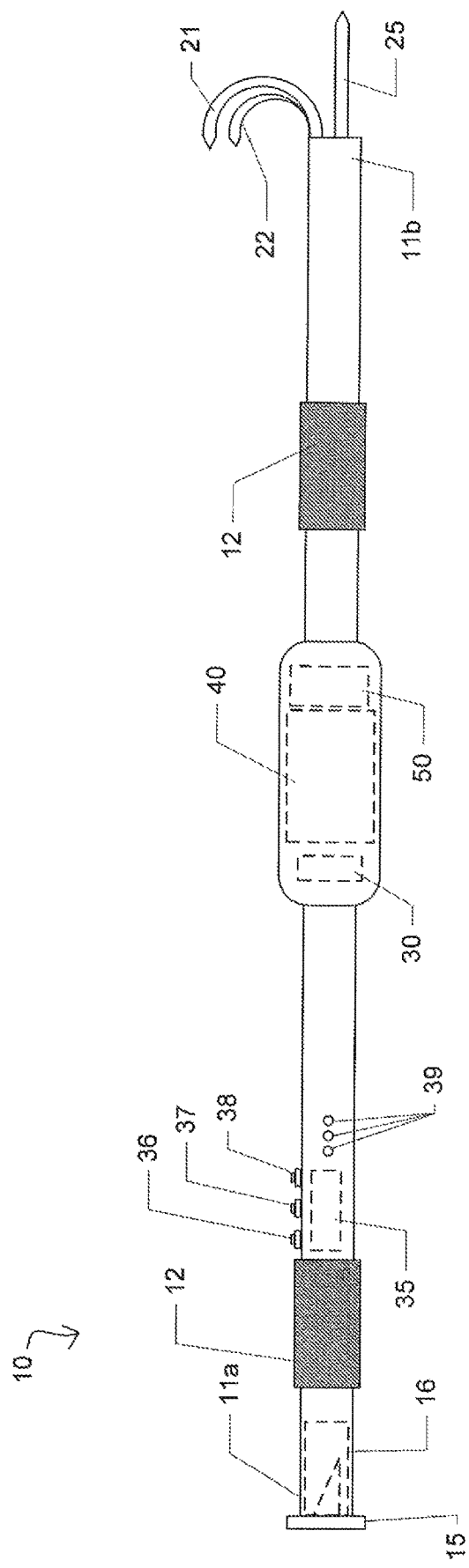
FIG. 1 is a side view of one embodiment of the electric gaff hook device that is useful for understanding the inventive concepts disclosed herein.
Figure 2:
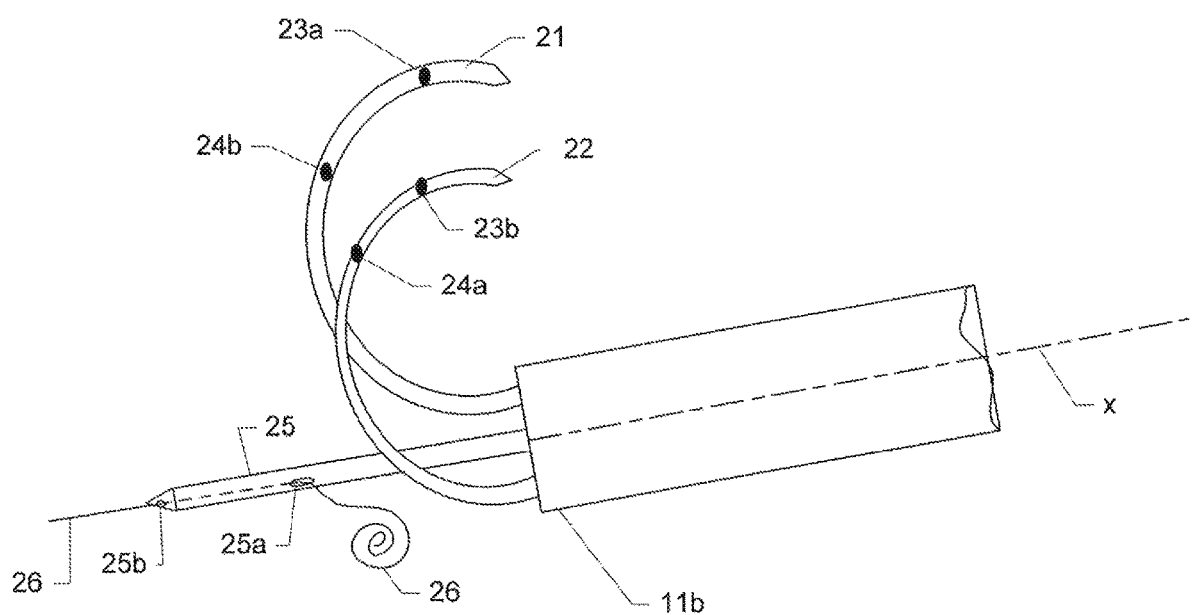
FIG. 2 is a perspective cutout view of the distal end of the electric gaff hook device in accordance with one embodiment of the invention.
Figure 3:
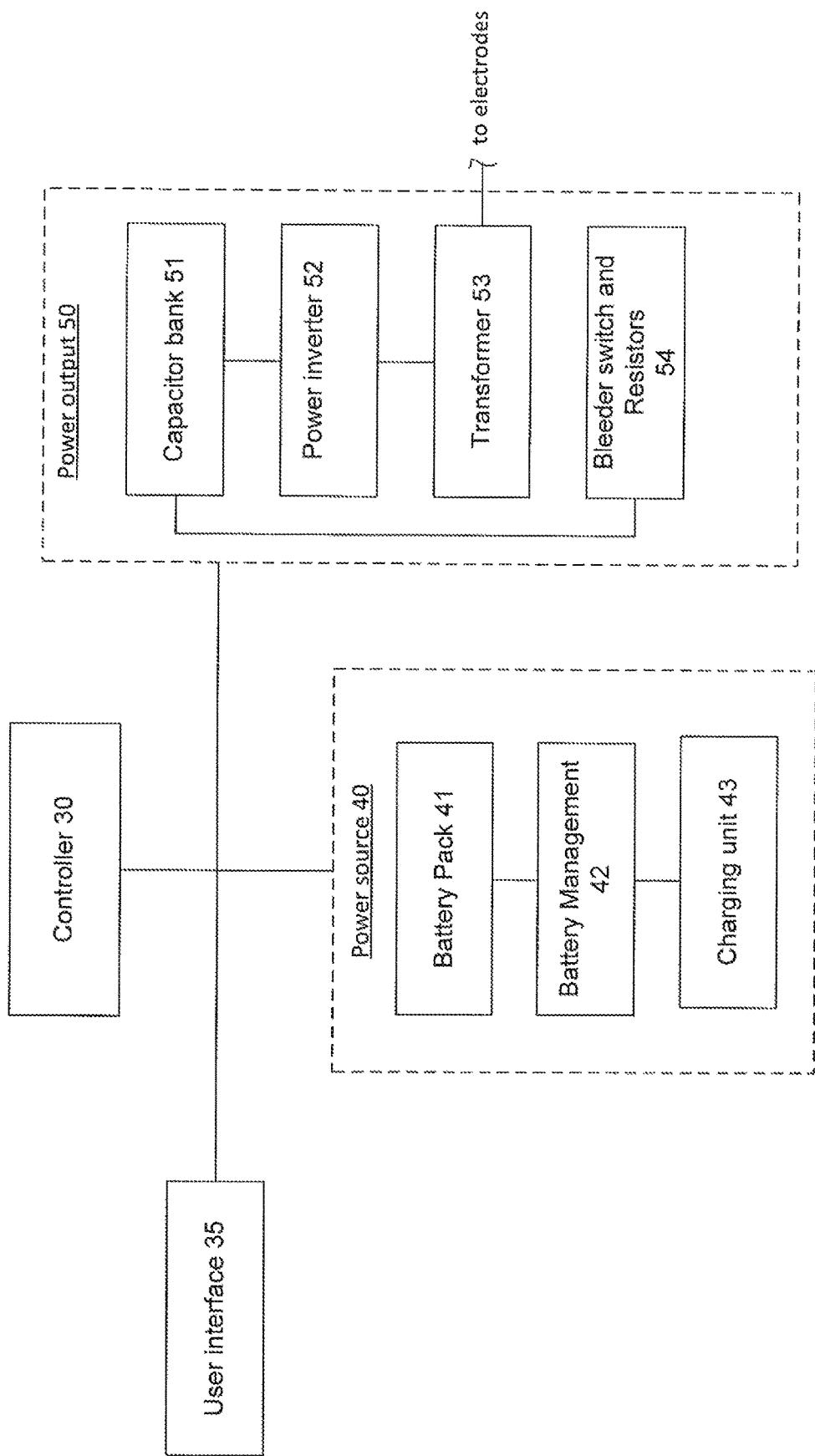
FIG. 3 a simplified block diagram of the electronic suite of the electric gaff hook device, in accordance with one embodiment of the invention.

FIGS. 1-3 illustrate one embodiment of an electric gaff hook device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, the electric gaff device 10 can include an elongated pole having one or more hooks along a distal end. A plurality of electrodes is provided in the hooks and are connected to a power and control system that selectively delivers an electric shock onto a fish that is engaged with the hook through the electrodes. A spike extends from the distal end of the pole and includes an elongated wire for performing ike jime to euthanize the captured fish.

As shown best at FIG. 1, the elongated pole 11 can include a first end 11a and a second end 11b. In the preferred embodiment, the pole can be constructed from or covered with an electrically isolative (i.e., non-electrically conductive) material such as wood, plastic, or composite materials, for example, however any number of other materials are also contemplated.

In the preferred embodiment, the pole can be manufactured as a fixed-length device, but other embodiments are contemplated wherein the pole can be constructed from two or more segments that are telescopically engaged so as to allow a user to increase or decrease the length of the pole.

In one embodiment, a plurality of hand grips 12 can be positioned along the length of the pole. Each of the grips can also be constructed from electrically isolative materials such as rubber or foam, for example, so as to provide a second layer of shock protection to a user of the device, and for increasing the grip of a user when the device is wet.

In one embodiment, a knife 15 can be removably positioned along or within the pole. In the preferred embodiment, the knife can be positioned within an opening 16 located along the first end of the pole 11a such that the knife blade is positioned within the opening and the hilt of the knife is accessible outside of the opening. Although the knife may include any number of different shapes and sizes, in one preferred embodiment, the knife can comprise a drop blood fishing knife having a shortened blade (e.g., 1-3 inches) as is known in the art.

The device 10 can include at least one, but preferably two hooks 21 and 22 that extend outward from the second end of the pole 11b. Each of the hooks can include a curved shape having a sharpened tip for piercing the flesh of a fish and can work alone or in tandem to engage and lift a fish onto a boat or dock.

As described herein, each of the hooks 21 and 22 can include any number of different shapes and sizes, and may include barbs or other such components as are known in the art. In the preferred embodiment, the hooks 21 and 22 will include identical shapes and sizes; however, embodiments are contemplated wherein the hooks 21 and 22 can include different shapes, sizes and/or construction materials relative to each other. In either instance, the hooks will preferably be constructed from a rugged material that is suitable for prolonged exposure to saltwater such as stainless steel, for example, however any number of other construction materials are also contemplated.

In one embodiment, each of the hooks can include functionality for independently and/or cumulatively delivering an AC voltage across a plurality of electrodes to selectively incapacitate a fish that is engaged by the hooks. In this regard, a first pair of electrodes 23a and 23b can be provided along the hooks 21 and 22, respectively. Each of the electrodes can be electrically connected to the below described power output unit 50 and selectively activated via the controller 35 such that a voltage is provided to one electrode (e.g., 23a) relative to the other electrode (e.g., 23b) sufficient to stun and incapacitate a fish.

As shown best at FIG. 2, one embodiment of the device 10 can include secondary electrodes 24a and 24b provided along the hooks 22 and 21, respectively. In such an embodiment, the electrodes will be arranged such that each hook has a high discharge electrode (e.g., 23a and 24a) and a low/ground electrode (e.g., 23b and 24b).

Such a feature beneficially allows the device to generate and discharge an electrical shock onto the fish in two distinct manners: 1) between the two hooks via electrodes 23a and 23b, when both hooks are engaged with a fish, and 2) along a single hook via electrodes 23a/24b or 24a/23b, when only a single hook has engaged the fish. In this regard, electrodes 23a and 23b are positioned closer to the tips of the hooks so as to ensure the primary means for shocking a fish captured by both hooks will use the electrodes spanning the two hooks.

In one embodiment, an elongated spike 25 can also be positioned along the second end of the pole 11b. The spike will preferably be aligned serially with the second end of the pole 11b so as to extend along the major axis X of the pole. The spike can function to allow a user to pierce the brain of the stunned fish that has been brought onboard so as to quickly and humanely euthanize the fish before it has recovered from the electrical shock, thus ensuring the fish does not suffer.

In one embodiment, the spike can include an elongated, rigid planar shaft having a first opening 25a along the body portion, and a second opening 25b along the sharpened tip. These openings can be connected by an internal channel and can function to receive an elongated wire 26 which can pass through the distal end of the sharpened tip and into the body of the dispatched fish, ideally along the spinal cord in order to perform both ike jime and shinkei jime.

FIG. 3 illustrates one embodiment of the electronic suite of the device 10. As shown, the device can include a controller 30 that is in electrical communication with a user interface 35, power source 40, and a power output unit 50. The components of the electronic suite can be connected together in accordance with known methodologies using any number of components such as various communication and power cables, system bus, pic controllers and the like, so as to achieve the functionality described herein.

The system controller 30 can function to control the operation of the power source and power output unit so as to selectively discharge an AC voltage across two electrodes in the hook(s) of the device in response to a command from the user interface. In one embodiment, the controller 30 can include, comprise, or consist of one or more printed circuit boards (PCB) containing any number of integrated circuits to complete the activities described herein. To this end, the controller can include one or more processors and/or central processing units that are conventionally connected to one or more memory components for storing operating instructions in the form of program code for the processor(s) to execute.

The controller can include or can be connected to a user interface 35 for sending and/or receiving operating instructions or information with a device user. As described herein, the user interface can include any number of different components capable of sending and/or receiving instructions from a device user. In the illustrated embodiment, the user interface 35 can include a plurality of distinct buttons such as a charge switch 36, a shock switch 37 and discharge switch 38, along with any number of visual display elements 39 such as multicolor LED lights, for example.

In the preferred embodiment, the shock switch 37 can be magnetically isolated and can include safety features such as a 2-stage activation (e.g., requiring a user to twist and then depress the button) or other such functionality for preventing inadvertent activation of the electrodes. Of course, other embodiments are contemplated wherein different components such as a display screen or touchscreen are provided, among others, for example.

The power source 40 can function to receive and store power for use by the device components. In one embodiment, the power source can include a battery pack 41, a battery management unit 42 and a battery charging unit 43.

As described herein, the battery pack 41 can include any number of individual rechargeable power cells which may be arranged serially and/or in parallel to produce a desired voltage such as 12v, 18v, 20v and/or 40v, for example. In the preferred embodiment, the cells will comprise lightweight lithium-ion polymer (LiPo) batteries; however, any number of other battery types are also contemplated. Several non-limiting examples include nickel-cadmium (NiCd), nickel-metal hydride (NiMH), lithium-ion (Li-ion), and rechargeable alkaline batteries, for example. Although described as a battery pack, other embodiments are contemplated wherein a single battery is utilized.

The battery management unit 42 can include any number of circuits and/or individual components such as diodes, transistors, relays and resistors, for example that can be electrically connected to the batteries to prevent the same from being overcharged and/or for preventing an over voltage or over current situation between the batteries and the controller or power output unit.

The battery charging unit 43 can include an internally located transformer and other circuitry that converts received power into a usable electrical charge for the battery pack 41. To this end, the type of charger and the output voltage will be dependent on the type of cells used and the output voltage of the battery pack 41. For example, if the above described LiPo batteries are utilized within the battery pack, the charger 43 would comprise a Lithium-Ion battery charger having built-in cell balancer. In either instance, the battery charger may include a receptacle for allowing the battery pack to be recharged via a cable plugged into an electrical outlet or may include an NFC charge receiver for conducting wireless charging.

The power output unit 50 can function to receive and selectively discharge power from the power source 40 in response to a command from the user interface 35. In one embodiment, the unit 50 can include a capacitor bank 51, a power inverter 52, a power transformer 53 and a plurality of bleeder resistors 54.

The capacitor bank 51 can function to receive and store electrical energy from the battery pack 41 in response to a user depressing the charge switch 36. During the charging process, the display 39 can notify the user the device is charging via a (yellow) flashing light, for example, and when the capacitor bank is fully charged, the display 39 can turn a solid (green) color. Of course, any number of other notifications and/or colors are also contemplated.

Upon receiving a command from the discharge switch 37, the capacitor bank can rapidly discharge the received power to the power inverter and the display 39 can provide a visual notification such as a solid or flashing (red) light, for example.

The power inverter 42 can function to receive and convert the DC voltage received from the capacitor bank into AC voltage. The output of the power inverter can be immediately fed into the transformer.

The power transformer 43 can comprise a step-up transformer that receives the AC voltage from the inverter, increases the same and transfers the energy directly to the electrodes. In the preferred embodiment, the output of the power transformer to the electrodes can sustain an electric field at a distance of 75 cm from a point centered between the charge-delivery electrodes up to 150 V/m for up to 30 seconds in seawater having a conductivity of 6 S/m. The electric field frequency will ideally be approximately 1000 Hertz. Such amounts being specifically chosen so as to be suitable for stunning fish ranging from 5 to 55 pounds with sufficient voltage to immobilize the same for a period of about 1 to 3 minutes, while remaining low enough to ensure such a shock does not permanently injure or kill a human in the unforeseen event, they make contact with the electrodes.

Of course, other amounts are also contemplated wherein a different electrical output can be achieved by the device. To this end, one embodiment is contemplated wherein the transformer comprises a variable output transformer having functionality for allowing a user to adjust the electrical output across any pair of electrodes using the user interface device. In such an embodiment, a user can increase or decrease the electrical output of all electrodes and/or can selectively increase or decrease the electrical output of only the electrodes spanning a single hook via electrodes 23a/24b or 24a/23b or spanning both hooks via electrodes 23a and 23b.

The bleeder unit 44 can also be connected to the capacitor bank 41 and can function to fully dissipate any electric charge in the power output unit. In one embodiment, the bleeder unit can include a switch that can open an electrical pathway from the capacitor bank to a plurality of resistors upon receiving a command from the bleed switch 38. During this time, the display 39 can provide a flashing (orange) light, for example.

In another embodiment, the bleeder unit can be automatically activated by the controller upon determining that the capacitor bank has been in a fully charged state for a predetermined period of time such as 2 minutes, for example. The inclusion of the bleeder unit acting as a built-in safety device for preventing a situation wherein the electrodes are inadvertently discharged, so as to ensure the device remains uncharged and safe between uses. Of course, any number of other components are contemplated for discharging and rendering the system safe.

In operation, a user can utilize one or both of the hooks to pierce a fish. Once engaged, a user can charge and shock the fish in order to prevent the fish from thrashing while being lifted onto a boat or other surface. Once on deck, the user can remove the hooks from the immobilized fish and use the spike to euthanize the fish in accordance with ike jime and shinkei jime practices.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A gaff hook device, comprising:
    an elongated pole having a first end and a second end;
    at least one hook that is positioned along the second end of the pole, each of the at least one hook including a curved shape and a sharpened tip;
    a plurality of electrodes that are positioned along each of the at least one hook;
    a power source that is configured to receive and store an electrical charge;
    a user interface that is in communication with the power source;
    a power output unit that is configured to selectively discharge the electrical charge to the plurality of electrodes
    an opening that is positioned along the pole; and
    a knife that is removably positioned within the opening.

2. The device of claim 1, wherein the power source includes a battery bank.

3. The device of claim 2, wherein the battery bank includes a plurality of rechargeable batteries.

4. The device of claim 3, wherein the power source includes a battery charger.

5. The device of claim 1, wherein the power output unit includes a capacitor that is in communication with the power source.

6. The device of claim 5 wherein the capacitor receives power from the power source in response to a user instruction from the user interface.

7. The device of claim 5, wherein the power output unit includes a transformer that is in communication with the capacitor and each of the plurality of electrodes.

8. The device of claim 7, wherein the transformer receives power from the capacitor, amplifies the received power, and discharges amplified power to the plurality of electrodes in response to a user instruction from the user interface.

9. The device of claim 1, further comprising:
    an elongated spike that extends outward from the second end of the pole.

* * * * *